United States Patent
Ouyang (10) Patent No.: US 11,969,307 B1
(45) Date of Patent: Apr. 30, 2024

(54) ELECTRIC TOOTHBRUSH HEAD

(71) Applicant: Lesky (Shenzhen) Trading Co., Ltd., Shenzhen (CN)

(72) Inventor: Zhi Ouyang, Shenzhen (CN)

(73) Assignee: Lesky (Shenzhen) Trading Co., Ltd., Shenzhen (CN)

( * ) Notice: Subject to any disclaimer, the term of this patent is extended or adjusted under 35 U.S.C. 154(b) by 0 days.

(21) Appl. No.: 18/525,744

(22) Filed: Nov. 30, 2023

(30) Foreign Application Priority Data

Nov. 3, 2023 (CN) .......................... 202323000335.7

(51) Int. Cl.
*A61C 17/22* (2006.01)
(52) U.S. Cl.
CPC .... *A61C 17/222* (2013.01); *A46B 2200/1066* (2013.01)
(58) Field of Classification Search
CPC .... A61C 17/222; A61C 17/225; A46B 5/0095
See application file for complete search history.

(56) References Cited

U.S. PATENT DOCUMENTS

| 11,793,618 B1* | 10/2023 | Huang ................. A61C 17/222 |
| 2023/0149140 A1* | 5/2023 | Zhou ..................... A61C 15/048 |
| | | 15/22.1 |

FOREIGN PATENT DOCUMENTS

CN   216962701 U   *   7/2022   ............. A61C 17/34

* cited by examiner

*Primary Examiner* — Laura C Guidotti (57) ABSTRACT

An electric toothbrush head includes a brush body and an insertion block. An upper part of the brush body is provided with bristles and a lower part of the brush body is provided with an insertion chamber. The insertion block is inserted into the insertion chamber and defines an insertion channel for inserting of a movement therein, wherein an outer wall of the movement abuts an inner wall of the insertion channel. A connecting section above the insertion channel is provided on an upper part of the insertion block. An adhesive section is provided on an upper part of the connecting section for fixing an outer wall of the adhesive section to an inner wall of the insertion chamber. A clamping section is provided on a lower part of the connecting section for fixing an outer wall of the clamping section to the inner wall of the insertion chamber.

11 Claims, 8 Drawing Sheets

ELECTRIC TOOTHBRUSH HEAD

CROSS-REFERENCE TO RELATED APPLICATIONS

The present application claims priority of Chinese Patent Application No. 202323000335.7, filed on Nov. 3, 2023, the entire contents of which are hereby incorporated by reference.

TECHNICAL FIELD

The present application relates to the technical field of toothbrush heads, and in particular to an electric toothbrush head.

BACKGROUND

Electric toothbrushes make brush heads thereof generate high-frequency vibration through a rapid rotation or vibration of movements thereof, decomposing the toothpaste into fine foam instantly, thereby thoroughly cleaning the teeth.

An electric toothbrush includes a brush handle and an electric toothbrush head, wherein the movement is provided on a top of the brush handle. The electric toothbrush head includes a brush body with bristles and an insertion block inserted into a lower part of the brush body. An insertion channel is defined in the insertion block, and the movement is inserted into and abuts the insertion channel. The high-frequency vibration of the movement is transmitted to the brush body through the insertion block, so as to drive the brush body to vibrate at high-frequency, and accordingly the bristles on the brush body vibrate at high-frequency.

In the related art, when the insertion block is inserted into the brush body, there is a phenomenon of unstable connection between the insertion block and the brush body. During the use of the electric toothbrush head, the insertion block is easy to disengage from the brush body, resulting in unusable of the electric toothbrush head, and thus the service life of the electric toothbrush head is relatively short.

SUMMARY

An object of the present application is to provide an electric toothbrush head to solve the problem of short service life of the electric toothbrush head in the related art.

In order to achieve the above object, a technical solution of the present application provides an electric toothbrush head that includes a brush body and an insertion block,
  an upper part of the brush body being provided with bristles and a lower part of the brush body being provided with an insertion chamber, wherein the insertion chamber extends through a bottom of the brush body;
  the insertion block being inserted into the insertion chamber and defining an insertion channel for inserting of a movement therein, the insertion channel extending through a bottom of the insertion block, an outer wall of the movement abuts an inner wall of the insertion block around the insertion channel when the movement is inserted into the insertion channel;
  a connecting section being provided on an upper part of the insertion block and located above the insertion channel;
  an adhesive section being provided on an upper part of the connecting section, an outer wall of the adhesive section being fixed to an inner wall of the brush body around the insertion chamber by colloidal bonding; and
  a clamping section being provided on a lower part of the connecting section, and an outer wall of the clamping section and the inner wall of the brush body around the insertion chamber being fixed relative to each other by clamping of a clamping structure which is concave-convex shaped.

In some embodiments, a gap is defined between the outer wall of the adhesive section and the inner wall of the brush body around the insertion chamber, and colloid is filled in the gap to form an adhesive layer which bonds the outer wall of the adhesive section and the inner wall of the brush body around the insertion chamber fixedly; and wherein a top of the adhesive section is configured to be arc-shaped and forms an arc-shaped surface.

In some embodiments, the clamping structure comprises two clamping slots provided on the outer wall of the clamping section and two clamping bars provided on the inner wall of the brush body around the insertion chamber, the two clamping slots are arranged on two sides of the clamping section, respectively, the two clamping bars are arranged on two sides of the inner wall of the brush body around the insertion chamber, respectively; and the two clamping bars are correspondingly engaged into the two clamping slots, respectively, so as to clamp and fix the clamping section in the insertion chamber.

In some embodiments, the adhesive layer extends into the clamping slots and fills between the clamping slots and the clamping bars, so as to fixing the clamping bars in the clamping slots by bonding.

In some embodiments, the inner wall of the brush body around the insertion chamber is provided with a chamber positioning surface which extends longitudinally and is planar, an outer wall of the connecting section is provided with a block positioning surface which extends longitudinally and is planar, and the chamber positioning surface and the block positioning surface face towards and abut against each other; and wherein the adhesive layer extends into a position between the chamber positioning surface and the block positioning surface, fixing the chamber positioning surface and the block positioning surface together by bonding.

In some embodiments, an annular flange is provided at the bottom of the insertion block and expands outwardly, the annular flange extends along a circumferential direction of the insertion block and has a step surface orientated upwardly, and the step surface extends along the circumferential direction of the insertion block; and wherein the annular flange is located below the brush body, and the step surface abuts against the bottom of the brush body from bottom to top.

In some embodiments, a hollow area is provided in the insertion block and extends longitudinally, and intercommunicates the insertion channel with an outside; an elastic strip is provided in the hollow area and extends longitudinally, and both ends of the elastic strip are fixed; an outer face of the elastic strip protrudes outwardly to form an outer convex part, an inner face of the elastic strip protrudes inwardly to form an inner convex part, and the outer convex part abuts against the inner wall of the brush body around the insertion chamber and the inner convex part abuts against the movement.

In some embodiments, the arc-shaped surface is concaved downwardly to form a plurality of strip-shaped grooves which intersect with each other vertically and horizontally to form a network structure; the grooves extend downwardly to the clamping section and communicate with the clamping slots; and the adhesive layer fills the strip-shaped grooves and extends along the strip-shaped grooves into the clamping slots.

In some embodiments, a middle portion of the arc-shaped surface is concaved downwardly to form a plurality of central grooves, the central groove extends curvedly and downwardly to penetrate through an outer circumferential wall of the adhesive section, and the adhesive layer fills the central grooves to interconnect the colloid on the arc-shaped surface and the colloid on the outer circumferential wall of the adhesive section integrally.

In some embodiments, the outer convex part is connected to an elastic sheet which is made of metal and curved, an inner end of the elastic sheet is embedded and fixed in the elastic strip, a middle part of the elastic sheet has a curved middle section, and an outer end of the elastic sheet is bent to form an embedding section; and wherein the inner wall of the brush body around the insertion chamber forms an embedding groove, the embedding section is fixed in the embedding groove, and the middle section is suspended and arranged between the elastic strip and the inner wall of the brush body around the insertion chamber.

Compared with the prior art, the electric toothbrush head provided by the present application includes an insertion block being inserted into an insertion chamber of a brush body, wherein an adhesive section of the insertion block is fixed to the brush body by bonding, and a clamping section of the insertion block is fixed to the brush body by clamping of a concave-convex shaped clamping structure, achieving multi-position and multi-way fixation, making the connection between the insertion block and the brush body more stable. When the movement drives the electric toothbrush head to vibrate at high-frequency, the insertion block will not disengaged from the brush body and thus the service life of the electric toothbrush head is prolonged.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make the purposes, technical solutions, and advantages of the present application clearer, a further detailed description of the present application will be provided in combination with the accompanying drawings and embodiments as follows. It should be understood that the specific embodiments described here are only intended to explain the present application and are not intended to limit the present application.

A detailed description of the implementation of the present application in combination with specific embodiments is as follows.

In the accompanying drawings of this embodiment, the same or similar labels correspond to the same or similar components. In the description of the present application, it should be understood that if there are terms such as "up", "down", "left", "right" indicating the orientation or position relationship based on the orientation or position relationship shown in the accompanying drawings, it is only for the convenience of describing the present application and simplifying the description, and not to indicate or imply that the device or component referred to must have a specific orientation, be constructed and operated in a specific orientation. Therefore, the terms used to describe the positional relationship in the accompanying drawings are only for illustrative purposes and cannot be understood as limiting the present application. For those ordinary skilled in the art, the specific meanings of the above terms can be understood based on specific circumstances.

Referring to FIG. 1 to FIG. 8, preferred embodiments of the present application are provided.

Figure 1:
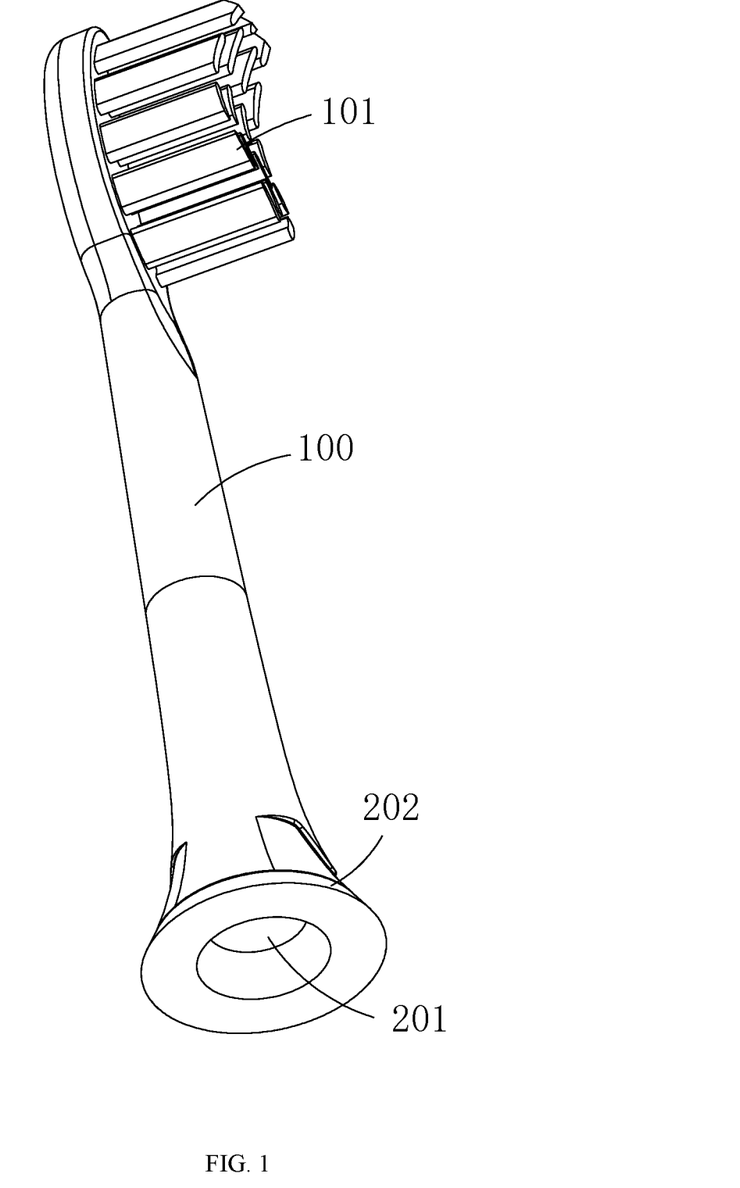
FIG. 1 is a schematic view of an electric toothbrush head provided by an embodiment of the present application.
Figure 2:
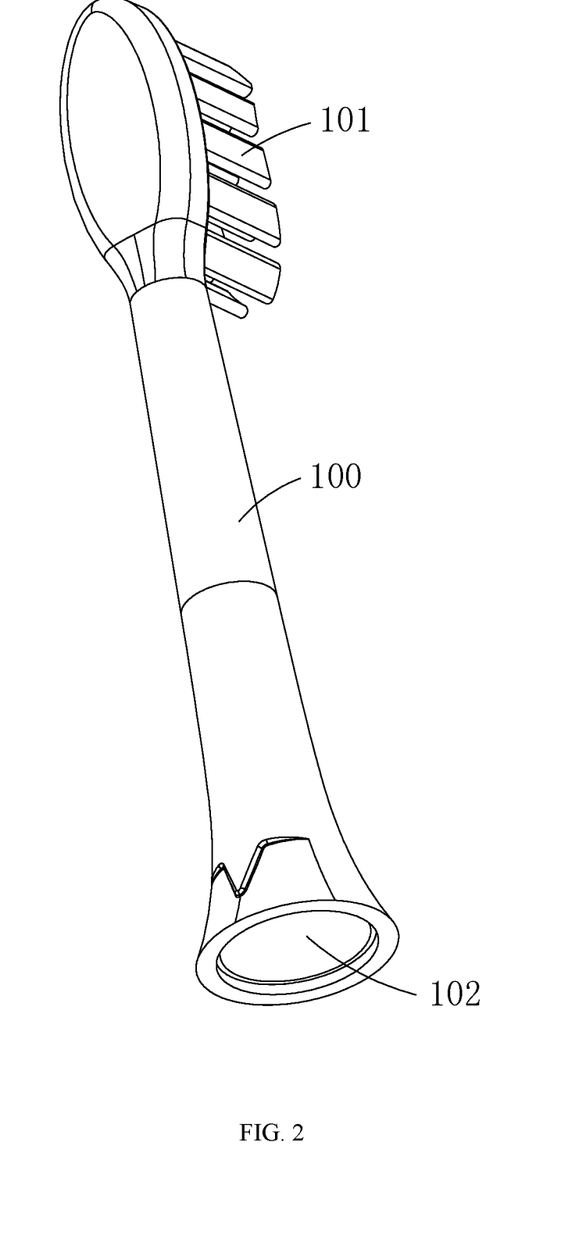
FIG. 2 is a schematic view of a brush body provided an embodiment of by the present application.

An electric toothbrush head provided in this embodiment is used to connect a movement of a brush handle, wherein the movement is inserted into the electric toothbrush head. Through a high-frequency vibration of the movement, the electric toothbrush head in whole is driven to vibrate, and high-frequency vibration of its bristles 101 is realized.

The electric toothbrush head includes a brush body 100 and an insertion block 200. An upper part of the brush body 100 is provided with the bristles 101, and a lower part of the brush body 100 is provided with an insertion chamber 102. The insertion chamber 102 extends through a bottom of the brush body 100, and the insertion block 200 is inserted into the insertion chamber 102 through the bottom of the brush body 100. The insertion block 200 defines an insertion channel 201 for inserting of the movement therein, which extends through a bottom of the insertion block 200. When the movement is inserted into the insertion channel 201, an outer wall of the movement abuts an inner wall of the insertion block 200 around the insertion channel 201, so as to ensure relative fixation between the movement and the insertion block 200.

After the movement is inserted into the insertion channel 201, it is fixed relative to the electric toothbrush head. The high-frequency vibration of the movement is transmitted to the brush body 100 through the insertion block 200, thereby driving the brush body 100 to vibrate at high-frequency, and finally making the bristles 101 on the brush body 100 vibrate at high-frequency.

Figure 4:
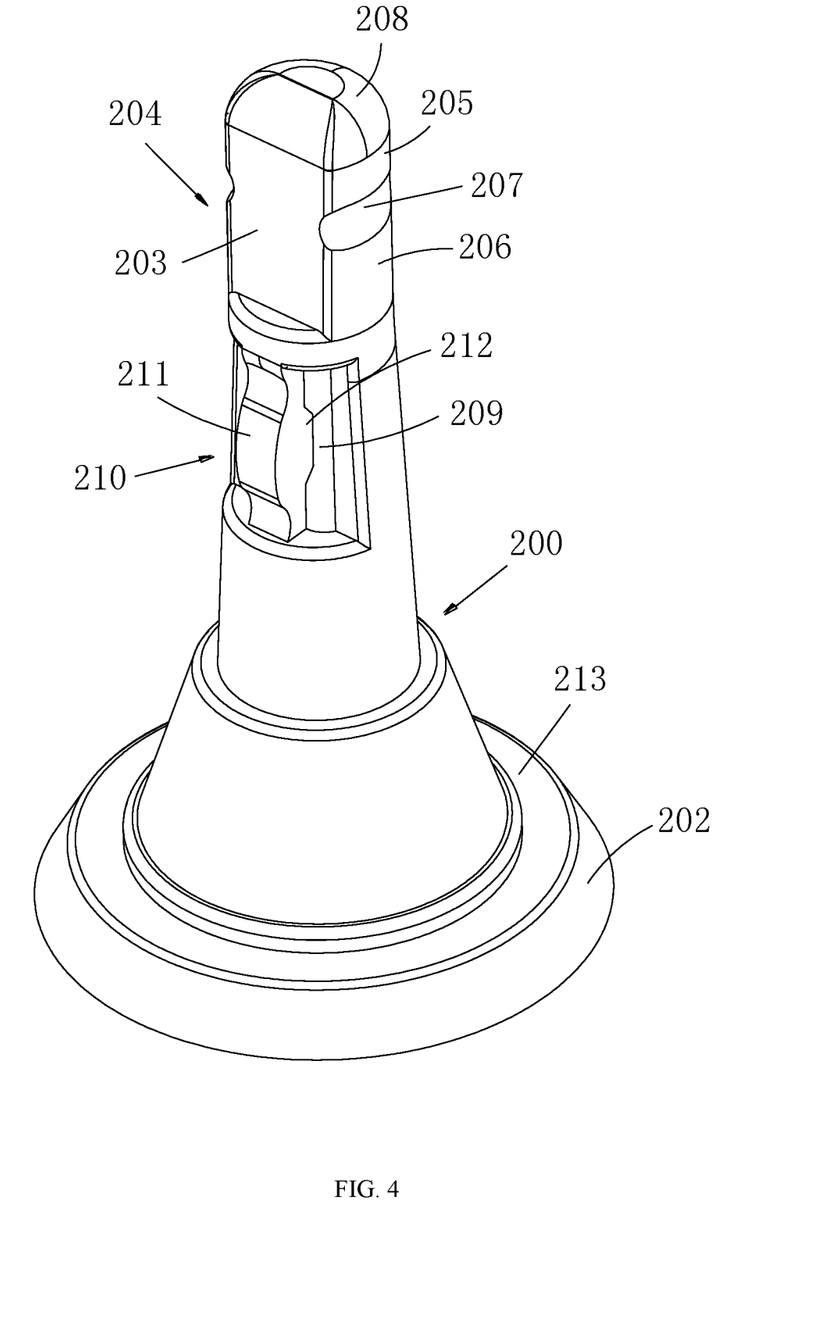
FIG. 4 is a schematic view of an insertion block provided by an embodiment of the present application.
Figure 5:
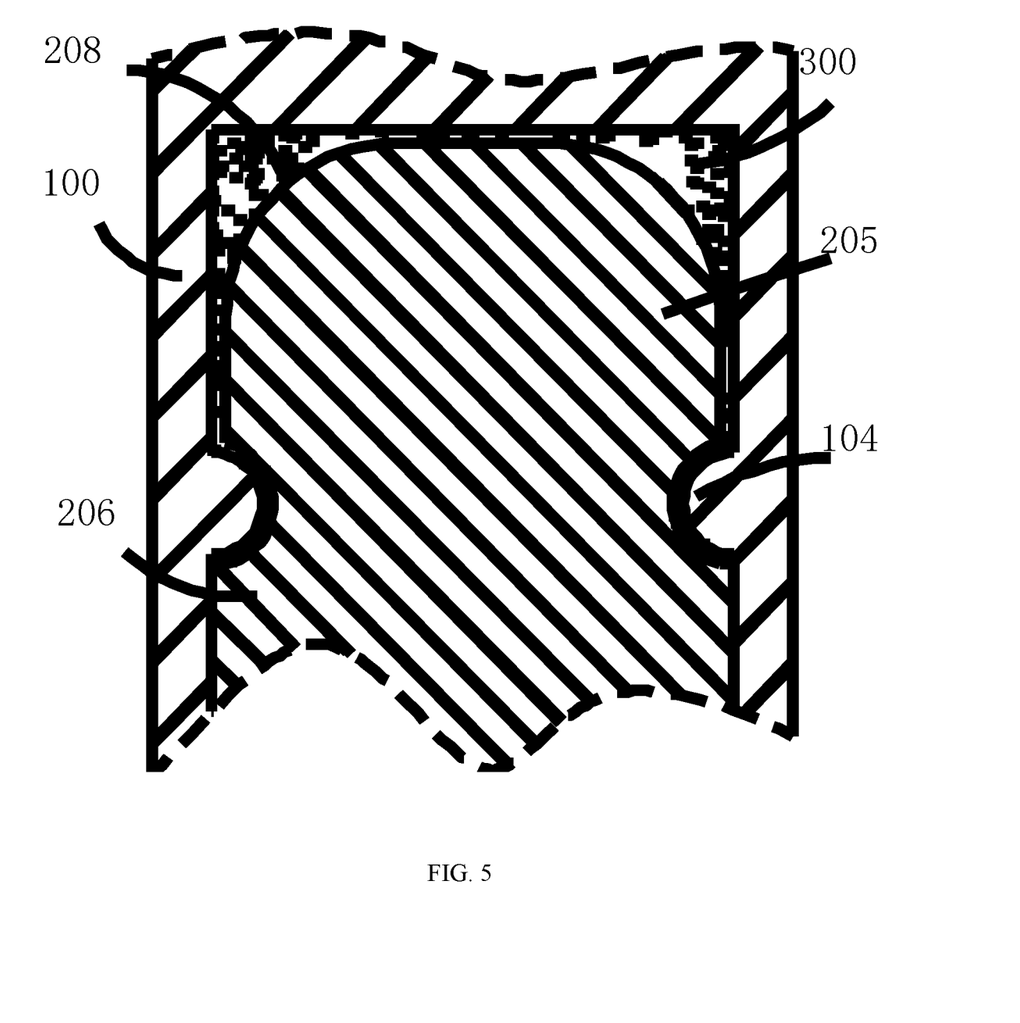
FIG. 5 is a cross-sectional view showing a connecting section engaged in an insertion chamber.

An upper part of the insertion block 200 is provided with a connecting section 204, wherein the connecting section is located above the insertion channel 201. An upper part of the connecting section 204 is provided with an adhesive section 205, wherein an outer wall of the adhesive section 205 is fixed to an inner wall of the brush body 100 around the insertion chamber 102 by colloidal bonding. A lower part of the connecting section 204 is provided with a clamping section 206, wherein an outer wall of the clamping section 206 is fixed relative to the inner wall of the brush body 100 around the insertion chamber 102 by clamping of a clamping structure which is concave-convex shaped.

The electric toothbrush head provided above includes an insertion block 200 being inserted into an insertion chamber 102 of a brush body 100, wherein an adhesive section 205 of the insertion block 200 is fixed to the brush body 100 by bonding, and a clamping section 206 of the insertion block 200 is fixed to the brush body 100 by clamping of a concave-convex shaped clamping structure, achieving multi-position and multi-way fixation, making the connection between the insertion block 200 and the brush body 100 more stable. When the movement drives the electric toothbrush head to vibrate at high-frequency, the insertion block 200 will not disengaged from the brush body 100 and thus the service life of the electric toothbrush head is prolonged.

In an actual assembly process, the brush body 100 is placed upside down, and colloid, which may be quick drying colloid, is dropped into the insertion chamber 102. Then, the insertion block 200 is inserted into the insertion chamber 102 from top to bottom. During inserting of the insertion block 200 against the colloid, the colloid is squeezed and flows between the outer wall of the adhesive section 205 and the inner wall of the brush body 100 around the insertion chamber 102, so that the outer wall of the adhesive section 205 and the inner wall of the brush body 100 around the insertion chamber 102 are fixed together by bonding.

In this embodiment, the outer wall of the adhesive section 205 includes a top end wall and an external circumferential wall of the adhesive section 205. Gaps are formed between the inner wall of the brush body 100 around the insertion chamber 102 and the top end wall, the external circumferential wall of the adhesive section 205, respectively. The colloid fills the gaps to form an adhesive layer 300, which fixes the outer wall of the adhesive section 205 and the inner wall of the brush body 100 around the insertion chamber 102 together by bonding.

During inserting of the insertion block 200 into the insertion chamber 102, the presence of the gaps facilitates flowing of the colloid between the outer wall of the adhesive section 205 and the inner wall of the brush body 100 around the insertion chamber 102, i.e., facilitates the formation of the adhesive layer 300.

Figure 6:
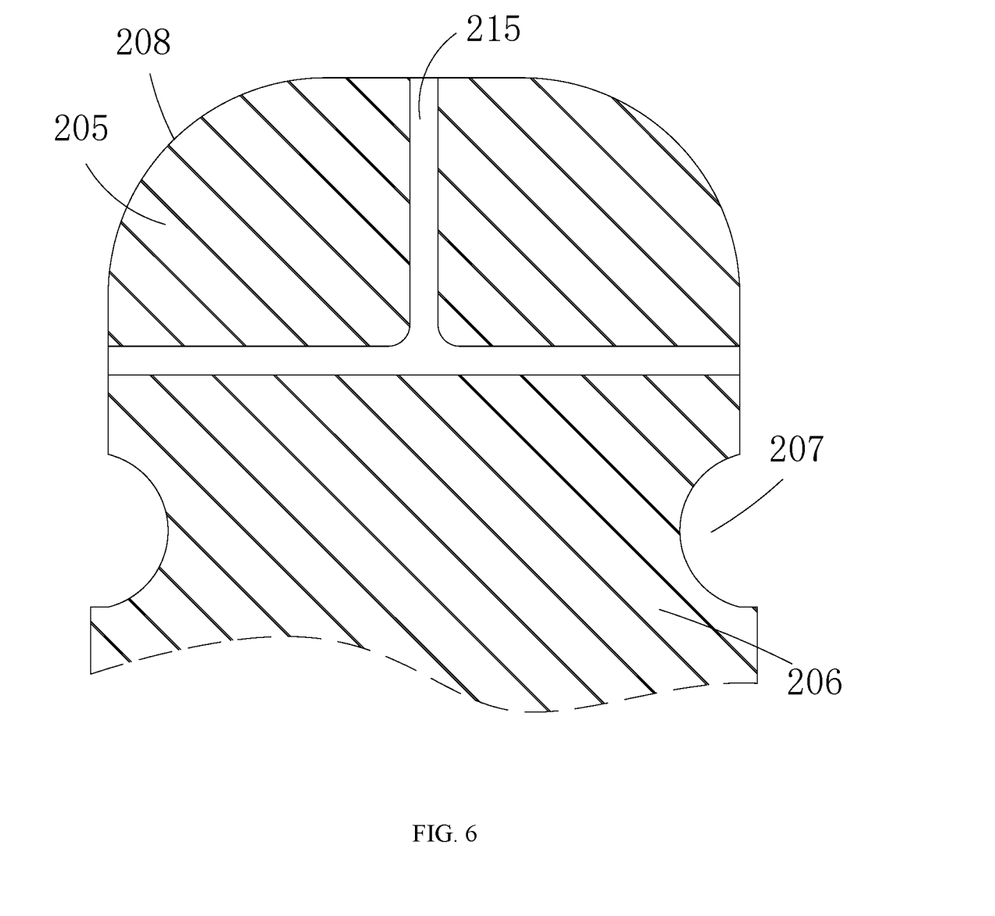
FIG. 6 is a cross-sectional view of a connecting section provided by an embodiment of the present application.

The top of the adhesive section 205 is configured to be arc-shaped, and forms an arc-shaped surface 208. During inserting of the insertion block 200 into the insertion chamber 102, the arc-shaped surface 208 first contacts the colloid in the insertion chamber 102. Under the pressing of the arc-shaped surface 208, the colloid extends along the arc-shaped surface 208 towards the outer circumferential wall of the adhesive section 205. The shape of the arc-shaped surface 208 is curved and smooth, facilitating the extension of the colloid after being pressed.

Figure 3:
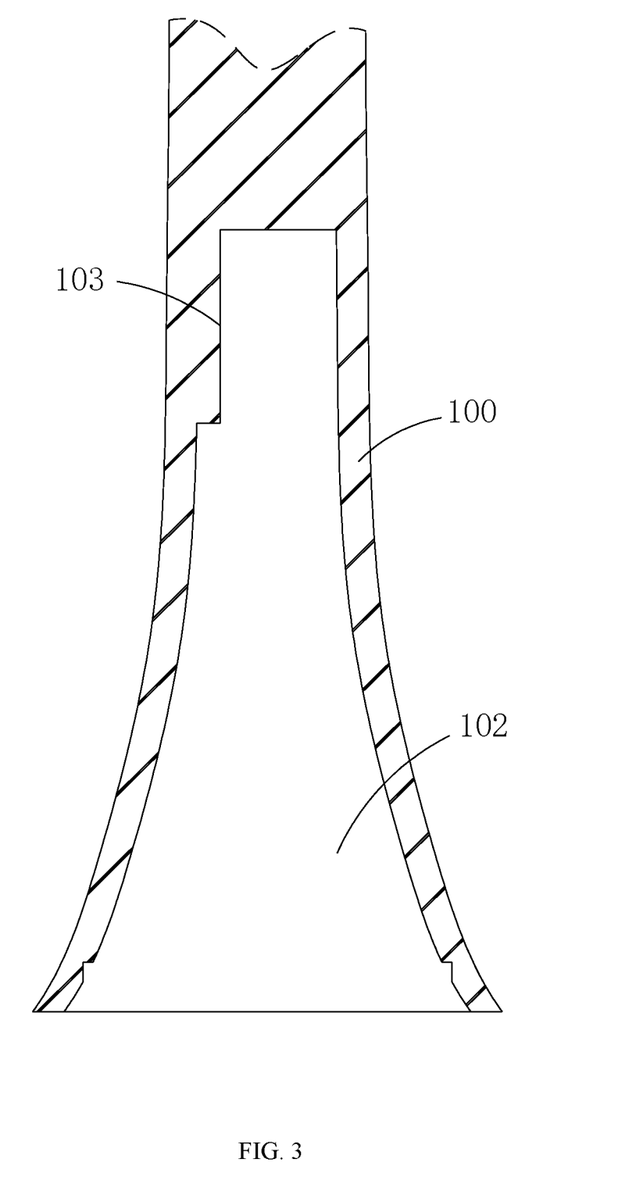
FIG. 3 is a cross-sectional view of the brush body provided by an embodiment of the present application.

In this embodiment, the clamping structure includes two clamping slots 207 defined in the outer wall of the clamping section 206 and two clamping bars 104 provided on the inner wall of the brush body 100 around the insertion chamber 102. The two clamping slots 207 are arranged on two sides of the clamping section 206, respectively; and the two clamping bars 104 are arranged on two sides of the inner wall of the brush body 100 around the insertion chamber 102, respectively. Each of the two clamping bars 104 is engaged into one corresponding clamping slot 207, so as to clamp and fix the clamping section 206 into the insertion chamber 102.

During inserting of the insertion block 200 into the insertion chamber 102, the top of the adhesive section 205 presses against the colloid and thus the colloid extends to form the adhesive layer 300, until the clamping bars 104 are engaged into the clamping slots 207, respectively. At this time, position of the insertion block 200 inside the insertion chamber 102 with a preset insertion depth is achieved; the clamping structure clamps and fixes the clamping section 206 in the brush body 100, and the adhesive layer 300 bonds and fixes the adhesive section 205 in the brush body 100.

In this embodiment, the adhesive layer 300 extends into the clamping slots 207 and fills between the clamping slots 207 and the clamping bars 104, fixing the clamping bars 104 in the clamping slots 207 by bonding. In this way, the clamping bars 104 can be fixed in the clamping slots 207, making the fit between the clamping bars 104 and the clamping slots 207 be more stable and thus avoiding disengaging of the clamping bars 104 from the clamping slots 207.

Of course, the clamping structure is not limited to the cooperation of the clamping slots 207 and the clamping bars 104, and may have various other structures, as long as it can clamp and fix the clamping section 206 in opposite directions.

The inner wall of the brush body 100 around the insertion chamber 102 is provided with a chamber positioning surface 103 which extend longitudinally and is planar. The outer wall of the connecting section 204 is provided with a block positioning surface 203 which extend longitudinally and is planar. The chamber positioning surface 103 and the block positioning surface 203 face towards and abut each other.

During inserting of the insertion block 200 into the insertion chamber 102, the block positioning surface 203 needs to be arranged facing towards the chamber positioning surface 103, so as to ensure that the insertion block 200 is accurately inserted into the insertion chamber 102, that is, ensuring an insertion direction of the insertion block 200.

In this embodiment, the adhesive layer 300 extends to a position between the chamber positioning surface 103 and the block positioning surface 203, and fixes the chamber positioning surface 103 and the block positioning surface 203 by bonding. In this way, in addition to the relative fixedly connection between the adhesive section 205, the clamping section 206 and the brush body 100, the block positioning surface 203 is bonded and connected to the brush body 100, making the insertion block 200 inserted in the insertion chamber 102 be more stable, and thus the connection between the insertion block 200 and the brush body 100 be more stable.

In this embodiment, the bottom of the insertion block 200 is provided with an annular flange 202 which expends outwardly. The annular flange 202 extends along a circumferential direction of the insertion block 200 and has a step surface 213 orientated upwardly and extending along the circumferential direction of the insertion block 200. The annular flange 202 is located below the brush body 100, and the step surface 213 abuts against the bottom of the brush body 100 from bottom to top.

By means of setting the annular flange 202, firstly, when the insertion block 200 is inserted into the insertion chamber 102 with a preset depth, the step surface 213 abuts against the bottom of the brush body 100 to achieve the depth position of the insertion block 200; secondly, the connecting section 204 is bonded and clamped in the insertion chamber 102 of the brush body 100, and the annular flange 202 abuts against the bottom of the brush body 100 from bottom to top, so that the upper and lower parts of the insertion block 200 are fixed and connected to the brush body 100 respectively. Connecting positions between the insertion block 200 and the brush body 100 are multiple and further increased, making the connection between the insertion block 200 and the brush body 100 be more stable. Further, when the movement inserted in channel 201 vibrates at high-frequency, the high-frequency vibration of the movement transmitted to the insertion block 200 is further transmitted to the brush body 100 through multiple positions, which is conducive to the transmission of the high-frequency vibration.

Figure 7:
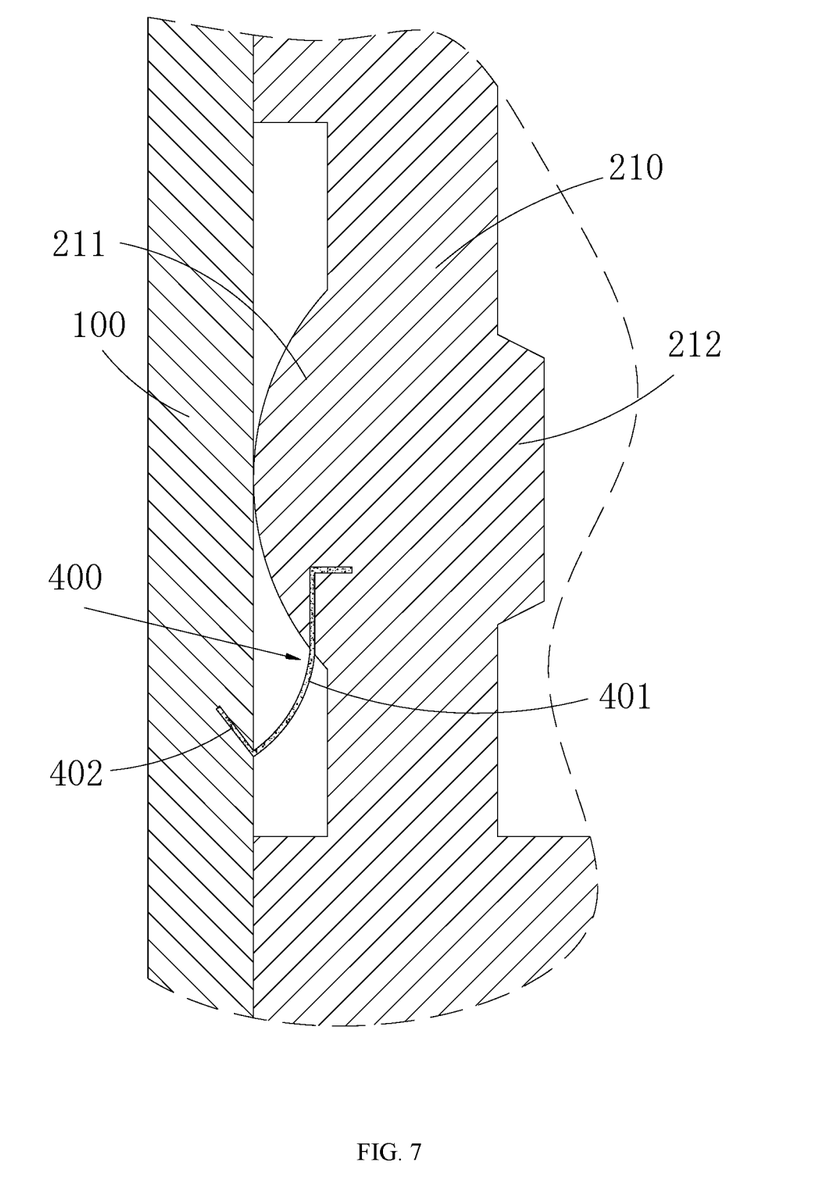
FIG. 7 is a cross-sectional view showing an elastic strip and an elastic sheet engaged in an insertion chamber.

In this embodiment, the insertion block 200 100 is provided with a hollow area 209, which extends longitudinally and intercommunicates the insertion channel 201 with an outside. The hollow area 209 is provided with an elastic strips 210, wherein the elastic strips 210 extends longitudinally with both ends thereof being fixed. An outer face of the elastic strip 210 protrudes outwardly to form an outer convex part 211, and an inner face of the elastic strip 210 protrudes inwardly to form an inner convex part 212. The outer convex part 211 abuts against the inner wall of the brush body 100 around the insertion chamber 102, and the inner convex part 212 abuts against the movement.

During the high-frequency vibration of the movement, the elastic strip 210 vibrates due to the high-frequency vibration of the movement and thus generates elastic deformation, which is conducive to transmit the high-frequency vibration of the movement to the brush body 100, achieving the effect of elastic transmission of vibration.

Figure 8:
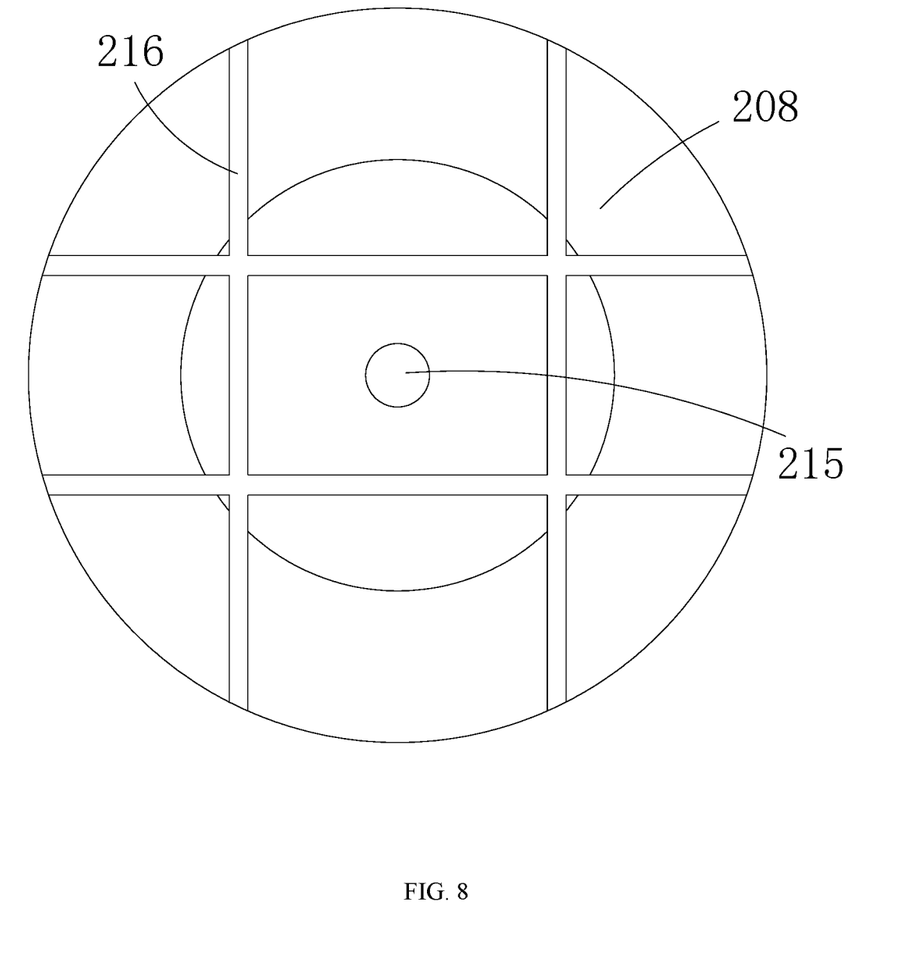
FIG. 8 is a top plan view of a connecting section provided by an embodiment of the present application.

In this embodiment, the arc-shaped surface 208 is concaved downwardly to form a plurality of strip-shaped grooves 216. The grooves 216 intersect with each other vertically and horizontally to form a network structure. The grooves 216 extend downwardly to the clamping section 206 and communicate with the clamping slots 207. The adhesive layer 300 fills the grooves 216 and extends along the grooves 216 into the clamping slots 207. In this way, an embedded bonding is formed between the adhesive layer 300 and the arc-shaped surface 208, which has a larger bonding area and better bonding effect, enhancing the bonding stability between the adhesive section 205 and the brush body 100.

In this embodiment, a central part of the arc-shaped surface 208 is concaved downwardly to form a plurality of central channels 215. The central channels 215 extend curvedly and downwardly to penetrate through the outer circumferential wall of the adhesive section 205. The adhesive layer 300 fills the central channels 215, and connects the colloid on the arc-shaped surface 208 with the colloid on the outer circumferential wall of the adhesive section 205 integrally as one piece.

During pressing of the colloid in the insertion chamber 102 by the insertion block 200, the colloid will enter the central channels 215 and flows along the central channels 215, connecting the colloid on the outer circumferential wall of the adhesive section 205 integrally as one piece. In this way, the colloid will penetrate into the adhesive section 205 through the central channels 215, and the adhesive layer 300 will combine with the bonding section 205 as a one piece.

In this embodiment, an elastic sheet 400 is connected to the outer convex part 211. The elastic sheet 400 is made of metal and configured to be curved. An inner end of the elastic sheet 400 is embedded and fixed inside the elastic strip 210, a middle part of the elastic sheet 400 is provided with a curved middle section 401, and an outer end of the elastic sheet 400 is bent to form an embedding section 402. The inner wall of the brush body 100 around the insertion chamber 102 is provided with an embedding groove, and the embedding section 402 is fixed in the embedding groove. The middle section 401 is suspended and arranged between the elastic strip 210 and the inner wall of the brush body 100 around the insertion chamber 102.

During the high-frequency vibration of the movement in the insertion channel 201, it drives the elastic strip 210 to vibrate at the high-frequency synchronously, and thus the elastic strip 210 generates elastic deformation. At this time, the elastic sheet 400 also generates elastic deformation and high-frequency vibration along with the elastic strip 210, and the high-frequency vibration of the elastic sheet 400 is synchronously transmitted to the brush body 100 through the embedding section 402, enabling the brush body 100 to better vibrate at the high-frequency synchronously. Further, by the connection between the elastic sheet 400 and the brush body 100, the connection stability between the insertion block 200 and the brush body 100 can be enhanced.

The above merely describes preferred embodiments of the present application without intention to limit the scope of the present application. Any modifications, equivalent replacements, improvements, and etc. made within the spirit and principle of the present application should be within the scope of the present application.

What is claimed is:

1. An electric toothbrush head, comprising a brush body and an insertion block,
    an upper part of the brush body being provided with bristles and a lower part of the brush body being provided with an insertion chamber, wherein the insertion chamber extends through a bottom of the brush body;
    the insertion block being inserted into the insertion chamber and defining an insertion channel for inserting of a movement therein, the insertion channel extending through a bottom of the insertion block, an outer wall of the movement abuts an inner wall of the insertion block around the insertion channel when the movement is inserted into the insertion channel;
    a connecting section being provided on an upper part of the insertion block and located above the insertion channel;
    an adhesive section being provided on an upper part of the connecting section, an outer wall of the adhesive section being fixed to an inner wall of the brush body around the insertion chamber by colloidal bonding; and
    a clamping section being provided on a lower part of the connecting section, and an outer wall of the clamping section and the inner wall of the brush body around the insertion chamber being fixed relative to each other by clamping of a clamping structure which is concave-convex shaped;
    wherein a gap is defined between the outer wall of the adhesive section and the inner wall of the brush body around the insertion chamber, and colloid is filled in the gap to form an adhesive layer which bonds the outer wall of the adhesive section and the inner wall of the brush body around the insertion chamber fixedly; and
    wherein a top of the adhesive section is configured to be arc-shaped and forms an arc-shaped surface.

2. The electric toothbrush head according to claim 1, wherein the clamping structure comprises two clamping slots provided on the outer wall of the clamping section and two clamping bars provided on the inner wall of the brush body around the insertion chamber, the two clamping slots are arranged on two sides of the clamping section, respectively, the two clamping bars are arranged on two sides of the inner wall of the brush body around the insertion chamber, respectively; and the two clamping bars are correspondingly engaged into the two clamping slots, respectively, so as to clamp and fix the clamping section in the insertion chamber.

3. The electric toothbrush head according to claim 2, wherein the adhesive layer extends into the clamping slots and fills between the clamping slots and the clamping bars, so as to fixing the clamping bars in the clamping slots by bonding.

4. The electric toothbrush head according to claim 1, wherein the inner wall of the brush body around the insertion chamber is provided with a chamber positioning surface which extends longitudinally and is planar, an outer wall of the connecting section is provided with a block positioning surface which extends longitudinally and is planar, and the chamber positioning surface and the block positioning surface face towards and abut against each other; and wherein the adhesive layer extends into a position between the chamber positioning surface and the block positioning surface, fixing the chamber positioning surface and the block positioning surface together by bonding.

5. The electric toothbrush head according to claim 1, wherein an annular flange is provided at the bottom of the insertion block and expands outwardly, the annular flange extends along a circumferential direction of the insertion block and has a step surface orientated upwardly, and the step surface extends along the circumferential direction of the insertion block; and wherein the annular flange is located below the brush body, and the step surface abuts against the bottom of the brush body from bottom to top.

6. The electric toothbrush head according to claim 1, wherein a hollow area is provided in the insertion block and extends longitudinally, and intercommunicates the insertion channel with an outside; an elastic strip is provided in the hollow area and extends longitudinally, and both ends of the elastic strip are fixed; an outer face of the elastic strip protrudes outwardly to form an outer convex part, an inner face of the elastic strip protrudes inwardly to form an inner convex part, and the outer convex part abuts against the inner wall of the brush body around the insertion chamber and the inner convex part abuts against the movement.

7. The electric toothbrush head according to claim 6, wherein the outer convex part is connected to an elastic sheet which is made of metal and curved, an inner end of the elastic sheet is embedded and fixed in the elastic strip, a middle part of the elastic sheet has a curved middle section, and an outer end of the elastic sheet is bent to form an embedding section; and wherein the inner wall of the brush body around the insertion chamber forms an embedding groove, the embedding section is fixed in the embedding groove, and the middle section is suspended and arranged between the elastic strip and the inner wall of the brush body around the insertion chamber.

8. The electric toothbrush head according to claim 1, wherein the arc-shaped surface is concaved downwardly to form a plurality of strip-shaped grooves which intersect with each other vertically and horizontally to form a network structure; the grooves extend downwardly to the clamping section and communicate with the clamping slots; and the adhesive layer fills the strip-shaped grooves and extends along the strip-shaped grooves into the clamping slots.

9. The electric toothbrush head according to claim 1, wherein a middle portion of the arc-shaped surface is concaved downwardly to form a plurality of central grooves, the central groove extends curvedly and downwardly to penetrate through an outer circumferential wall of the adhesive section, and the adhesive layer fills the central grooves to interconnect the colloid on the arc-shaped surface and the colloid on the outer circumferential wall of the adhesive section integrally.

10. An electric toothbrush head, comprising a brush body and an insertion block,
    an upper part of the brush body being provided with bristles and a lower part of the brush body being provided with an insertion chamber, wherein the insertion chamber extends through a bottom of the brush body;
    the insertion block being inserted into the insertion chamber and defining an insertion channel for inserting of a movement therein, the insertion channel extending through a bottom of the insertion block, an outer wall of the movement abuts an inner wall of the insertion block around the insertion channel when the movement is inserted into the insertion channel;
    a connecting section being provided on an upper part of the insertion block and located above the insertion channel;
    an adhesive section being provided on an upper part of the connecting section, an outer wall of the adhesive section being fixed to an inner wall of the brush body around the insertion chamber by colloidal bonding; and
    a clamping section being provided on a lower part of the connecting section, and an outer wall of the clamping section and the inner wall of the brush body around the insertion chamber being fixed relative to each other by clamping of a clamping structure which is concave-convex shaped;
    wherein a hollow area is provided in the insertion block and extends longitudinally, and intercommunicates the insertion channel with an outside; an elastic strip is provided in the hollow area and extends longitudinally, and both ends of the elastic strip are fixed; an outer face of the elastic strip protrudes outwardly to form an outer convex part, an inner face of the elastic strip protrudes inwardly to form an inner convex part, and the outer convex part abuts against the inner wall of the brush body around the insertion chamber and the inner convex part abuts against the movement.

11. The electric toothbrush head according to claim 10, wherein the outer convex part is connected to an elastic sheet which is made of metal and curved, an inner end of the elastic sheet is embedded and fixed in the elastic strip, a middle part of the elastic sheet has a curved middle section, and an outer end of the elastic sheet is bent to form an embedding section; and wherein the inner wall of the brush body around the insertion chamber forms an embedding groove, the embedding section is fixed in the embedding groove, and the middle section is suspended and arranged between the elastic strip and the inner wall of the brush body around the insertion chamber.

\* \* \* \* \*